(12) United States Patent
Chen et al.

(10) Patent No.: US 11,563,315 B2
(45) Date of Patent: Jan. 24, 2023

(54) BUSWAY CONNECTOR AND POWER SUPPLY DEVICE

(71) Applicant: Huawei Digital Power Technologies Co., Ltd., Shenzhen (CN)

(72) Inventors: Peixing Chen, Dongguan (CN); Minxiang Zhang, Dongguan (CN); Yong Li, Dongguan (CN); Xiangtao Meng, Dongguan (CN); Fugao Zhao, Dongguan (CN); Bingjin Wu, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/545,549

(22) Filed: Dec. 8, 2021

(65) Prior Publication Data

US 2022/0102956 A1 Mar. 31, 2022

Related U.S. Application Data

(63) Continuation of application No. PCT/CN2020/108113, filed on Aug. 10, 2020.

(30) Foreign Application Priority Data

Aug. 26, 2019 (CN) .......................... 201910800868.2

(51) Int. Cl.
*H01R 13/512* (2006.01)
*H02G 5/08* (2006.01)
(Continued)

(52) U.S. Cl.
CPC .............. *H02G 5/08* (2013.01); *H01R 13/512* (2013.01); *H01R 13/639* (2013.01); *H01R 31/06* (2013.01)

(58) Field of Classification Search
CPC .... H01R 13/512; H01R 13/639; H01R 31/06; H01R 25/162; H01R 25/14; H01R 25/145; H02G 5/00; H02G 5/08; H02G 5/007

See application file for complete search history.

(56) References Cited

U.S. PATENT DOCUMENTS 3,180,924 A * 4/1965 Rowe ..................... H02G 5/007
174/88 B
3,614,297 A * 10/1971 Carlson .................. H02G 9/065
174/70 B (Continued)

FOREIGN PATENT DOCUMENTS

| CN | 202633863 U | 12/2012 |
| CN | 203423261 U | 2/2014 |

(Continued)

*Primary Examiner* — Thanh Tam T Le
(74) *Attorney, Agent, or Firm* — Rimon PC

(57) ABSTRACT

A busway connector is provided including a base, a drive member, a connection component, and a locking member. The locking member is disposed through the base and fastened to the drive member, and the locking member fits with the base to drive the drive member to move in a first direction. The connection component includes a connection block and connection units connected in series in a row, each connection unit includes a first insulation sheet, a first conductive sheet fastened to the first insulation sheet, a second insulation sheet, and a second conductive sheet fastened to the second insulation sheet. A slot is formed between the first conductive sheet and the second conductive sheet, the first insulation sheet is elastically connected to the second insulation sheet by using an elastic member, and the connection block is slidably connected to the base.

20 Claims, 14 Drawing Sheets

(51) Int. Cl.
*H01R 13/639* (2006.01)
*H01R 31/06* (2006.01)

(56) References Cited

U.S. PATENT DOCUMENTS

| | | | | |
|---|---|---|---|---|
| 3,639,676 | A * | 2/1972 | Dempsey, Jr. | H02G 5/06 174/68.3 |
| 3,786,394 | A * | 1/1974 | Koenig | H02G 5/007 174/88 B |
| 4,029,379 | A * | 6/1977 | Kotala | F16B 31/021 411/3 |
| 4,627,680 | A * | 12/1986 | Weimer | H02G 5/007 174/88 B |
| 4,804,804 | A * | 2/1989 | Hibbert | H02G 5/10 174/68.2 |
| 4,842,533 | A * | 6/1989 | Beberman | H02G 5/007 174/88 B |
| 4,950,841 | A * | 8/1990 | Walker | H01R 25/162 174/68.2 |
| 5,261,830 | A * | 11/1993 | Jego | H02G 5/007 439/213 |
| 7,819,681 | B1 * | 10/2010 | Rodrigues | H02G 5/007 174/88 B |
| 7,862,356 | B1 * | 1/2011 | O'Leary | H02G 5/007 174/68.2 |
| 8,177,569 | B1 | 5/2012 | Dozier et al. | |
| 8,378,219 | B2 * | 2/2013 | Lesieur | H02G 5/007 174/70 B |
| 8,864,510 | B2 * | 10/2014 | Walgenbach | H02G 5/007 439/210 |
| 8,926,351 | B2 * | 1/2015 | O'Leary | H02G 5/007 174/68.2 |
| 9,117,614 | B2 * | 8/2015 | Rahn | H01H 71/08 |
| 10,164,387 | B2 * | 12/2018 | Baillargeon | H02B 1/052 |
| 10,439,342 | B2 * | 10/2019 | Wynnik | H02G 5/002 |
| 2019/0148897 | A1 | 5/2019 | Rode et al. | |

FOREIGN PATENT DOCUMENTS

| | | |
|---|---|---|
| CN | 204304352 U | 4/2015 |
| CN | 206041417 U | 3/2017 |
| CN | 107147064 A | 9/2017 |
| CN | 206685836 U | 11/2017 |
| CN | 207819395 U | 9/2018 |
| CN | 108847640 A | 11/2018 |
| CN | 109066545 A | 12/2018 |
| CN | 208256929 U | 12/2018 |
| CN | 208820151 U | 5/2019 |
| CN | 110518421 A | 11/2019 |
| CN | 110729687 A | 1/2020 |
| FR | 2173375 A5 | 10/1973 |
| JP | 2018113860 A | 7/2018 |
| KR | 100631469 B1 | 10/2006 |

\* cited by examiner

BUSWAY CONNECTOR AND POWER SUPPLY DEVICE

CROSS-REFERENCE TO RELATED APPLICATIONS

This application is a continuation of International Application No. PCT/CN2020/108113, filed on Aug. 10, 2020, which claims priority to Chinese Patent Application No. 201910800868.2, filed on Aug. 26, 2019. The disclosures of the aforementioned applications are hereby incorporated by reference in their entireties.

TECHNICAL FIELD

This application relates to the field of power supply device technologies, and in particular, to a connector that is in a power supply device and that is configured to be connected to a busway.

BACKGROUND

With development of science, technology and data, there is an increased demand for data centers. When upgrading data centers, there are increasingly high requirements for high-current transmission security and small product indoor space. In a data center equipment room, using a cable to transmit a high current provides no advantage in terms of security and spatial configuration. Cables are not feasible in data center equipment rooms in terms of multi-socket requirements and the need for subsequent expansion. Because a busway is characterized by a regular structure, convenient installation, flexible configuration, and the like, busways have gradually become a market mainstream in present data center equipment rooms.

The location of the busway on the top of the data center equipment room presents great construction difficulties for construction workers. Therefore, fast busway interconnection needs to be implemented for actual construction processes. However, on an actual construction site, existing busway interconnection processes are difficult to perform. The difficulty is mainly reflected in the following: (1) An interconnection location of a copper busbar needs to be adjusted, but the copper busbar is heavy, thick, and difficult to adjust. (2) A mating/unmating force for interconnecting to a connector is large, assembly is difficult during actual installation, and a surface of the copper busbar may be damaged to different degrees in an assembly process. Therefore, a busway connector that can implement fast connection is urgently needed in the industry.

SUMMARY

Embodiments of this application provide a busway connector, so that fast busway connection can be implemented, increasing installation efficiency.

According to a first aspect, an embodiment of this application provides a busway connector, including a base, a drive member, a connection component, and a locking member, where the drive member is located between the base and the connection component, the locking member is disposed through the base and connected to the drive member through fastening, and the locking member fits with the base to drive the drive member to move reciprocally in a first direction; the connection component includes a connection block and at least one connection unit connected in series in a row, each connection unit includes a first insulation sheet, a first conductive sheet fastened to the first insulation sheet, a second insulation sheet, and a second conductive sheet fastened to the second insulation sheet, a slot is formed between the first conductive sheet and the second conductive sheet, the first insulation sheet is elastically connected to the second insulation sheet by using an elastic member, the connection block is connected to a first insulation sheet of a connection unit at a row head through fastening and/or connected to a second insulation sheet of a connection unit at a row tail through fastening, and the connection block is slidably connected to the base and can move in a second direction relative to the base; and the drive member fits with the connection block, so that a force applied by the drive member on the connection block in the first direction generates a component force in the second direction, to drive the first conductive sheet and the second conductive sheet to approach each other and compress the elastic member.

The busway connector provided in this application is configured to connect a pair of interconnected busways. A copper busbar (referred to as a conductive sheet) of the busway is inserted into the slot between the first conductive sheet and the second conductive sheet, and the locking member is operated (the operation may be performed in a rotation or push-pull manner) to drive the drive member to move, to generate the component force in the second direction, so that all connection units press together, that is, the first conductive sheet and the second conductive sheet approach each other, to clamp the copper busbar of the busway. The elastic member is elastically connected between the first insulation sheet and the second insulation sheet, so that when the busway connector has not been installed onto the busway, due to an elastic expansion action of the elastic member, a spacing between the first conductive sheet and the second conductive sheet is relatively large and can be kept in a proper range. The proper range indicates that a proper spacing is just enough for easy insertion of one copper busbar of the busway, and does not simultaneously accommodate two copper busbars. In this way, it can be ensured that copper busbars are sequentially inserted into corresponding slots, to prevent misalignment, and the copper busbar of the busway can be inserted into the slot without a relatively large insertion force, making installation easier. In addition, installation and detachment can be implemented only by operating the locking member, and an operator can operate the locking member with a single hand, so that fast installation can be implemented for greater installation efficiency.

In this application, the elastic member may be disposed to be directly connected to the first insulation sheet and the second insulation sheet or indirectly connected to the first insulation sheet and the second insulation sheet, provided that it can be ensured that before installation, an elastic force of the elastic member can enable a proper spacing to be formed between the first conductive sheet and the second conductive sheet, that is, enable the first conductive sheet and the second conductive sheet to be in an open state, to facilitate insertion of the copper busbar of the busway; in an installed state, the first conductive sheet and the second conductive sheet approach each other, so that the elastic member can be compressed and store elastic potential energy; and in a detached state, a distance between the first conductive sheet and the second conductive sheet is enlarged under the action of the elastic potential energy. In a possible implementation, the elastic member is disposed between the first conductive sheet and the second conductive sheet and is in insulated contact with both the first conductive sheet and the second conductive sheet. The elastic member is in direct contact with the first conductive sheet and the second conductive sheet, provided that an insulation connection structure is formed at a contact location, to ensure that there is no short circuit between the first conductive sheet and the second conductive sheet.

In an implementation, the elastic member is an integrally molded insulation elastic pad-like structure, for example, a rubber pad. In this implementation, a material of the elastic member is not limited to rubber, and may be alternatively another non-conductive elastic material, such as silica gel, an insulation spring, or compressed foam, provided that the elastic member has an elastic expansion and contraction function. The elastic member is directly connected to the first conductive sheet and the second conductive sheet, so that the connection unit has a simple structure and is easy to assemble.

To enhance an elastic expansion and contraction capability of the elastic member, in an implementation, when the elastic member is an integral insulation pad-like structure, gaps are disposed in the elastic member. The gaps may be in a shape of a honeycomb, or another arrangement. For example, strip-shaped gaps are arranged in a shape of a multi-row and multi-column array, or annular gaps, circular gaps, or irregular gaps are distributed. Disposition of the gaps makes the elastic member easier to be compressed and prone to be elastically deformed. In addition, a weight is reduced, so that the busway connector is more lightweight.

In another implementation, the elastic member may alternatively include a metal piece. Insulation sheets are disposed at two ends of the metal piece. The metal piece is connected to the first conductive sheet and the second conductive sheet through fastening by using the insulation sheets. Disposition of the insulation sheets may prevent a short circuit between the first conductive sheet and the second conductive sheet. In this implementation, the metal piece is used as the elastic member, so that the elastic member has both relatively good elasticity and a relatively strong service life. The metal piece can implement relatively good elasticity by using a relatively small volume. This is helpful for making the busway connector more lightweight.

In a possible implementation, two ends of the elastic member are respectively directly connected to the first insulation sheet and the second insulation sheet. The elastic member is an insulation member, and may be made of an insulation material, or an insulation layer may be disposed on a surface of the elastic member to implement an insulation function of the elastic member. In this implementation in which the elastic member is directly connected to the first insulation sheet and the second insulation sheet, the elastic member may be disposed on the periphery of the first conductive sheet and the second conductive sheet. Provided that a location of the elastic member does not block an entrance of the slot, the elastic member may jointly surround the first conductive sheet and the second conductive sheet with the first insulation sheet and the second insulation sheet, and a location of the entrance of the slot remains. The elastic member is supported between the first insulation sheet and the second insulation sheet, so that a gap, namely, the slot, is formed between the first conductive sheet and the second conductive sheet. In another implementation, through holes may be disposed on the first conductive sheet and the second conductive sheet. The elastic member is connected to the first insulation sheet by being disposed through a through hole of the first conductive sheet, the elastic member is connected to the second insulation sheet by being disposed through a through hole of the second conductive sheet, and the elastic member is insulated from both the first conductive sheet and the second conductive sheet. The elastic member may be disposed in central areas of the first conductive sheet and the second conductive sheet. In this way, it helps to ensure that the connection unit has a stable structural layout, and the elastic member is elastically expanded and contracted more smoothly in the processes of installing and detaching the busway connector.

In a possible implementation, the component force in the second direction is perpendicular to the first conductive sheet and the second conductive sheet. The connection unit is driven, by using the force perpendicular to the first conductive sheet and the second conductive sheet, to move so that stable movement is ensured in a process in which the first conductive sheet and the second conductive sheet approach each other.

In a possible implementation, the first direction is perpendicular to the second direction, the drive member moves and pushes the connection block in the first direction, and the drive member fits with the connection block by using an oblique surface. The force applied by the drive member on the connection block is perpendicular to the oblique surface, to generate the component force in the second direction, so that all the connection units press together.

In a possible implementation, the connection component further includes a connection tube extending in the second direction, and all the connection units are connected to the connection tube in series and can slide thereon. In this implementation, all the connection units are connected in series as a whole by using the connection tube. Under the action of an external force, the first insulation sheet, the second insulation sheet, the first conductive sheet, the second conductive sheet, and the elastic member of the connection unit can move on the connection tube, to adjust the spacing between the first conductive sheet and the second conductive sheet. In this application, a spacing between the first conductive sheet and the second conductive sheet in an uninstalled state is determined by displacing the elastic member, and in a detached state, an elastic force of the elastic member enables the spacing between the first conductive sheet and the second conductive sheet to become wider and be adjusted to the spacing in the uninstalled state.

In a possible implementation, there are two or more connection units, and a second insulation sheet of one of the connection units and a first insulation sheet of a neighboring connection unit are an integrally molded structure. Specifically, there may be five connection units, that is, the busway connector has five slots.

In a possible implementation, the connection unit includes an opening end and a bottom end that are oppositely disposed, and the connection tube is disposed through the connection unit and is located between the opening end and the bottom end. The connection tube is located in central areas of the first conductive sheet and the second conductive sheet, so that the connection component has a stable structure.

In a possible implementation, at a location of the opening end, a horn-shaped opening that extends outward from the slot is formed between the first insulation sheet and the second insulation sheet, and is used for guiding in a process of being plug-connected to the busway, to help insert the conductive sheet of the busway into the slot.

In a possible implementation, at a location of the bottom end, a lap structure is formed between the first insulation sheet and the second insulation sheet, so that the connection unit becomes an assembled integral architecture by using the lap structure, and a relative location of each component of the connection unit is fixed.

In a possible implementation, the lap structure includes a first lap wall and a first limiting wall that are integrally molded on the first insulation sheet, and a second lap wall and a second limiting wall that are integrally molded on the second insulation sheet, the first lap wall and the first limiting wall form an L-shaped structure, the second lap wall and the second limiting wall also form an L-shaped structure, the first lap wall is in contact with the second lap wall, and in a process in which the first conductive sheet and the second conductive sheet approach each other, the first lap wall and the second lap wall move oppositely to the second limiting wall and the first limiting wall, respectively. In this implementation, the connection unit becomes the assembled integral architecture by using the lap walls and the limiting walls of the lap structure.

In a possible implementation, a first accommodation groove is disposed on a surface of the first insulation sheet, the first conductive sheet is installed in the first accommodation groove and is adhered to a bottom surface of the first accommodation groove, a first through hole is disposed on the first insulation sheet, a first sleeve rises above the bottom surface, the first sleeve is located on the periphery of the first through hole, where the first through hole comprises a space surrounded by an inner wall of the first sleeve, the connection tube is disposed through the first through hole, and the first sleeve is disposed through the first conductive sheet, that is, the first sleeve is located between the first conductive sheet and the connection tube. In this implementation, a first positioning column further rises above the bottom surface of the first accommodation groove of the first insulation sheet, a first positioning hole is disposed on the first conductive sheet, and the first positioning column is disposed through the first positioning hole to determine an installation location of the first conductive sheet. The location of the first conductive sheet on the first insulation sheet is determined by using the first sleeve and the first positioning column, that is, in a process of assembling the connection unit, there is only one way the first conductive sheet and the first insulation sheet can be positioned. If the first conductive sheet is rotated or turned over, installation between the first conductive sheet and the first insulation sheet cannot be completed. In this way, an installation error can be prevented, to ensure an assembly pass rate of the busway connector and improve installation efficiency.

In a possible implementation, there are two connection blocks, respectively fastened to the first insulation sheet at the row head and the second insulation sheet at the row tail, and a hardness of the connection block is greater than a hardness of the first insulation sheet and the second insulation sheet. The two connection blocks are disposed at two ends of the connection component, so that in a process in which the drive member drives the two connection blocks to move, component forces perpendicular to the first conductive sheet and the second conductive sheet can be generated at both the two ends of the connection component. The component forces at the two ends are in opposite directions. Under the joint action of the two ends of the connection component, all the connection units are compressed, so that the first conductive sheet and the second conductive sheet approach each other, thereby improving efficiency of adjusting the spacing between the first conductive sheet and the second conductive sheet. In this implementation, the connection blocks are respectively fastened to the first insulation sheet at the row head and the second insulation sheet at the row tail, and directly fit with the drive member by using oblique surfaces. In a process of operating the locking member, the drive member generates a force directly applied on the connection block, and the connection block has a relatively high hardness requirement and therefore can withstand a relatively large external force. The first insulation sheet and the second insulation sheet are insulation materials, may be plastic members, and have low hardness requirements. Therefore, the hardness of the connection block needs to be greater than the hardness of the first insulation sheet and the second insulation sheet. In this implementation, a material of the connection block may be metal, materials of the first insulation sheet and the second insulation sheet may be plastic. The connection block and the first insulation sheet and the second insulation sheet may be integrally molded by using two materials, or may be a two-piece structure and connected through fastening by using, for example, a buckle or a screw.

In a possible implementation, the drive member includes a crossbeam and fittings part located on two opposite sides of the crossbeam, the connection block is partially located between the fitting part and the connection unit, and the fitting part fits with the connection block by using an oblique surface, so that movement of the drive block in the first direction is converted into movement of the connection block in the second direction, to clamp the connection unit. Specifically, in the process of operating the locking member, the fitting part of the drive member generates a force that is applied on the connection block and that is perpendicular to the oblique surface, to generate the component force in the second direction. The component force in the second direction is perpendicular to the first conductive sheet and the second conductive sheet, to drive the connection unit to move along the connection tube.

In a possible implementation, the crossbeam is movably connected to the base by using limiting screws. In this implementation, the base includes step holes, and the limiting screws are disposed through the step holes and fastened to the crossbeam. When the locking member drives the drive member to move to enable the first conductive sheet and the second conductive sheet to be in a clamped state, a part that is of the limiting screw and that is located on a surface that is of the base and that is opposite to the drive member extends into the step hole.

In a possible implementation, each connection block includes one pair of limiting columns, the base includes a baseplate and two pairs of columns that are integrally interconnected, and the two connection blocks are disposed between the two pairs of columns in a one-to-one correspondence, in other words, one connection block is disposed between one pair of columns located on one side of the baseplate, and the other connection block is disposed between one pair of columns located on the other side of the baseplate, that is, there is one connection block and one pair of columns on each side of the baseplate. A limiting groove extending in the second direction is disposed on each column, and the limiting column separately fits with the limiting groove, to prevent the installation block from moving in the first direction, and to allow the installation block to move in the second direction. The limiting groove is a recess formed on a surface of the column.

In a possible implementation, the locking member includes an installation part, a threaded part, and a fastening part that are integrally interconnected. The locking member is disposed through the base and fits with a threaded hole of the base by using the threaded part, the fastening part and the installation part are respectively located on two sides of the base, and the fastening part is connected to the drive member through fastening. In this implementation, the locking member is a screw structure, and the locking member is operated in a rotation manner, to drive the drive member to move. The locking member may be rotated by using a tool (for example, a wrench). Based on a thickness of the conductive sheet of the busway, the spacing between the first conductive sheet and the second conductive sheet may be adjusted by rotating the locking member by different quantities of turns, so that the conductive sheet of the busway can be clamped.

In a possible implementation, a trench is disposed on a surface that is of the first conductive sheet and that faces the second conductive sheet, and the trench is used to improve a friction coefficient of the surface of the first conductive sheet and provide a heat dissipation channel. Specifically, there are a plurality of trenches, arranged on the surface of the first conductive sheet to form a vertically knurled pattern, so that a clamping force is improved, and ventilation can be performed by using the trench, to implement heat dissipation.

According to a second aspect, an embodiment of this application provides a power supply device, including a first busway, a second busway, and the busway connector according to any one of the foregoing embodiments. The busway connector connects the interconnected first busway and second busway, and conductive sheets of the first busway and the second busway are inserted into the slot of the busway connector and electrically connected to the first conductive sheet and the second conductive sheet. The embodiments of this application are implemented, to resolve the existing problem that a busway interconnection process is difficult. In this application, a spacing between the first conductive sheet and the second conductive sheet is limited by using an elastic force of an elastic member, and the spacing can be maintained within a proper range. The proper range indicates that a proper spacing is just enough for easy insertion of one copper busbar of the busway, and does not simultaneously accommodate two copper busbars. In this way, it can be ensured that copper busbars are sequentially inserted into corresponding slots, to prevent misalignment, and the copper busbar of the busway can be inserted into the slot without a relatively large insertion force, so that installation is easy. In addition, installing and detachment can be implemented only by operating the locking member, and an operator can operate the locking member with a single hand, so that fast installation can be implemented for greater installation efficiency.

DESCRIPTION OF EMBODIMENTS

To describe the technical solutions in embodiments of this application or in the background more clearly, the following describes the accompanying drawings required for describing the embodiments of this application or the background.

Figure 1:
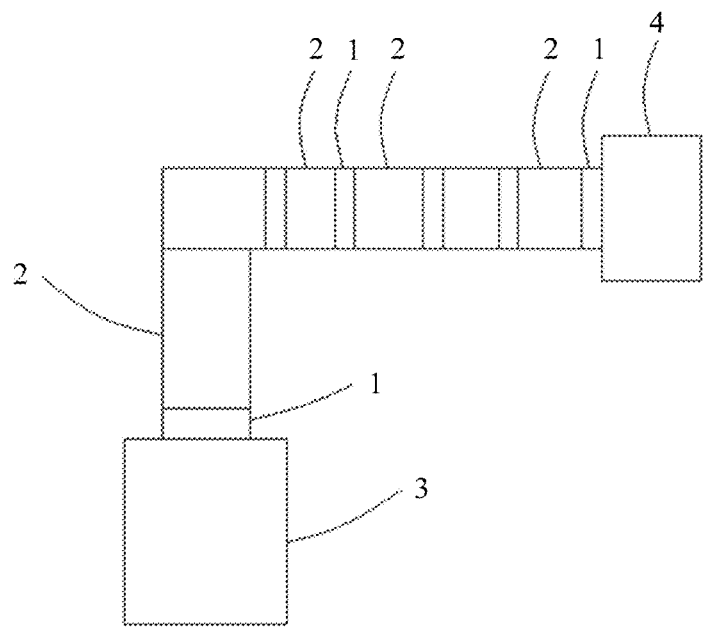
FIG. 1 is a schematic diagram of an application environment of a busway connector according to an implementation of this application.

This application provides a busway connector and a power supply device. The busway connector may be used for a power distribution cabinet in the power supply device. In addition to being used for interconnection between busways, the busway connector may be further used for interconnection between a power distribution cabinet or another device and a busway. FIG. 1 schematically depicts a connection line between a power distribution cabinet 3 and a current receiving device 4. The current receiving device 4 may be a power distribution cabinet, a UPS (uninterruptible power system/uninterruptible power supply), a switch cabinet, an air conditioner, or the like. In this application, two busways 2 are connected to each other by using a busway connector 1, the top of the power distribution cabinet 3 and a busway 2 may also be connected to each other by using a busway connector 1, and the current receiving device 4 and a busway 2 may also be connected to each other by using a busway connector 1, thereby effectively implementing safe transmission of a high current.

Figure 2:
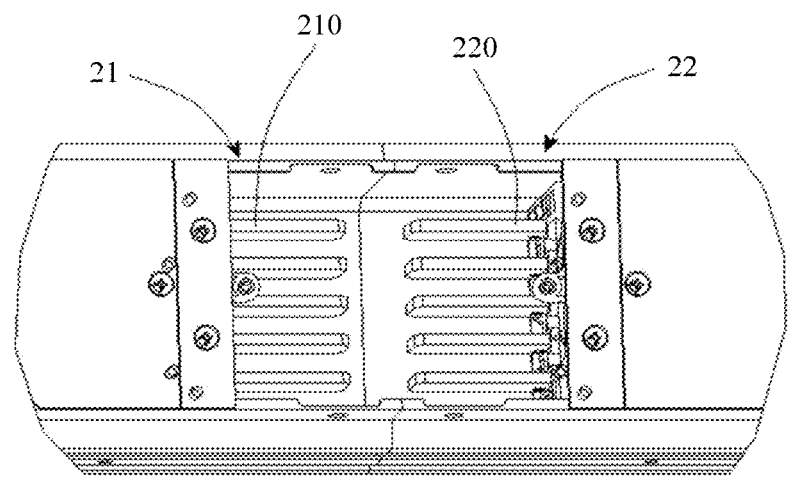
FIG. 2 is a schematic diagram of two interconnected busways.

As shown in FIG. 2, a busway 21 and a busway 22 are two interconnected busways, and transmit a current mainly by using a copper busbar 210 and a copper busbar 220 (the copper busbar is also referred to as a conductive sheet) of the busways. The busway is mainly used to implement safe transmission of a high current in place of a conventional cable.

Figure 3:
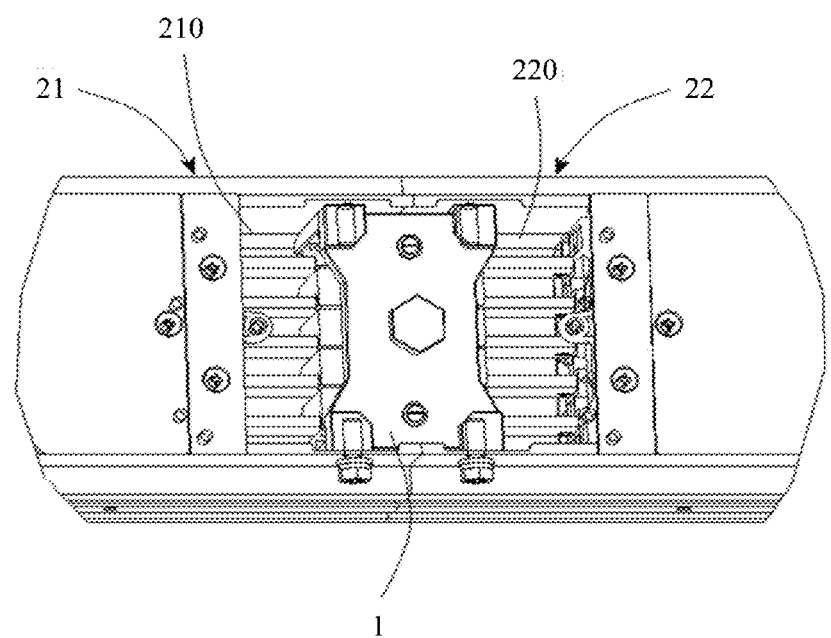
FIG. 3 is a schematic diagram in which a busway connector is installed at an interconnection location of two busways according to an implementation of this application.

As shown in FIG. 3, a busway connector 1 is installed at an interconnection location of the busway 21 and the busway 22.

Figure 4:
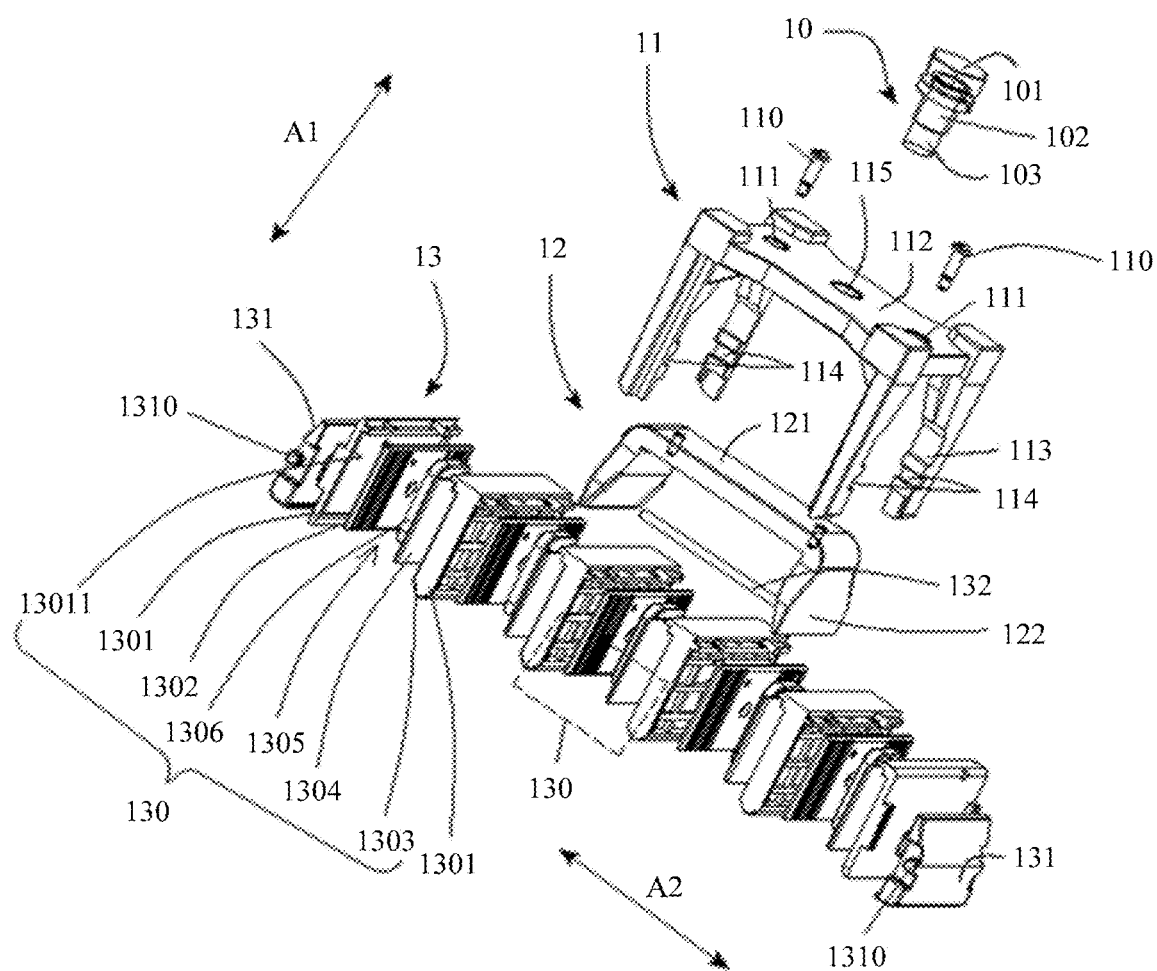
FIG. 4 is a schematic exploded view of a busway connector according to an implementation of this application.
Figure 5:
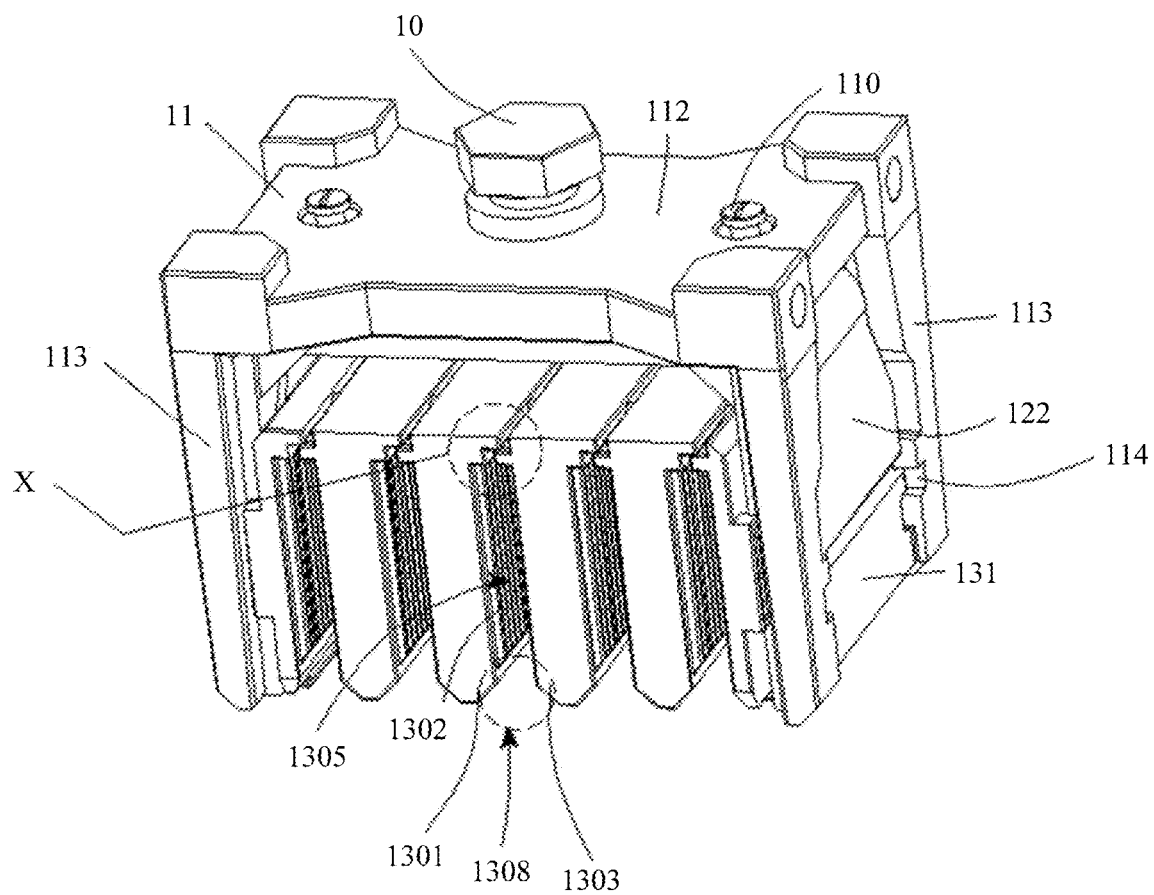
FIG. 5 is a schematic three-dimensional assembly view of a busway connector according to an implementation of this application.

As shown in FIG. 4 and FIG. 5, the busway connector 1 includes a locking member 10, a base 11, a drive member 12, and a connection component 13. The connection component 13 includes at least one connection unit 130 (a dashed-line box in FIG. 4 indicates that a part that is of the connection component and that is included in this part of area is one connection unit) connected in series in a row, and a connection block 131. One connection unit 130 is a combination of elements that form one slot in the connection component 13, and the slot is configured to be plug-connected to the copper busbars 210 and 220 of the busways. There may be one or more connection units 130 in the connection component 13 of the busway connector 1 provided in this application. When the connection component 13 has only one connection unit 130, it is equivalent that the connection component is an architecture in which only one connection unit is connected in series in a row, only one slot is formed, and a multi-phase transmission function may be implemented in one slot. When there are two or more connection units 130, it is equivalent that two or more connection units 130 are connected in series in a row, two or more slots are formed, and the slots have different signal transmission phases. For example, in an implementation, the connection component 13 includes five connection units 130, and separately implements transmission at different phases by using five slots. Specifically, a quantity of connection units 130 is determined based on a specific quantity of copper busbars (namely, conductive sheets) of the busway. The locking member 10, the base 11, the drive member 12, and the connection component 13 are sequentially arranged in a first direction. The drive member 12 is located between the base 11 and the connection component 13.

The base 11 includes a baseplate 112 and two pairs of columns 113 that are integrally interconnected. A threaded hole 115 is disposed on the baseplate 112. Specifically, the threaded hole 115 is located in a central area of the baseplate. The two pairs of columns 113 are respectively connected to four corners of the baseplate 112. An extension direction of the column 113 is a first direction A1, and the extension direction of the column 113 may be perpendicular to a plane on which the baseplate 112 is located. A limiting groove 114 configured to limit the connection component 13 is disposed on the column 113. The limiting groove 114 is a groove that is disposed on a surface of the column 113 and comprises a recess in the surface, and an extension direction of the limiting groove 114 is a second direction A2. Specifically, one pair of columns 113 are disposed on one side of the baseplate 112, assembly space is formed between the columns 113, and an opening of the limiting groove 114 faces the assembly space.

The drive member 12 includes a crossbeam 121 and fitting parts 122 located on two opposite sides of the crossbeam 121. The crossbeam 121 is located between the baseplate 112 of the base 11 and the connection component 13, and is configured to be connected to the locking member 10 through fastening. The two fitting parts 122 are respectively located between the two pairs of columns 113 (as shown in FIG. 5), and are configured to fit with the connection component. In an implementation, the crossbeam 121 is movably connected to the base 11 by using limiting screws 110. In this implementation, the base 11 includes step holes 111, and the limiting screws 110 are disposed through the step holes 111 and fastened to the crossbeam 121. When the locking member 10 drives the drive member 12 to move to enable a first conductive sheet 1302 and a second conductive sheet 1304 to be in a clamped state, a part that is of the limiting screw 110 and that is located on a surface that is of the base 11 and that is opposite to the drive member 12 extends into the step hole 111, that is, a head part of the limiting screw 110 extends into the step hole 111.

The locking member 10 is disposed through the threaded hole 115 of the base 11 and connected to the crossbeam 121 of the drive member 12 through fastening. The locking member 10 fits with the base 11 to drive the drive member 12 to move reciprocally in the first direction A1. In this implementation, the locking member 10 and the base 11 have a threaded fit. Specifically, the locking member 10 includes an installation part 101, a threaded part 102, and a fastening part 103 that are integrally interconnected. The locking member 10 is disposed through the base 11 and fits with the threaded hole 115 of the base 11 by using the threaded part 102, the fastening part 103 and the installation part 101 are respectively located on two sides of the base 11, and the fastening part 103 is connected to the drive member 12 through fastening. The fastening part 103 may be fastened to the drive member 12 in a threaded connection manner. Both the locking member 10 and the drive member 12 are metal members, and therefore the fastening part 103 may be connected to the drive member 12 through fastening by welding, or may be fastened to the drive member 12 by using an adhesive tape, a buckle, or the like. The installation part 101 is rotated to operate the locking member 10, to drive the drive member 12 to move. The locking member 10 may be rotated by using a tool (for example, a wrench). Based on a thickness of the conductive sheet of the busway, a spacing between the first conductive sheet and the second conductive sheet may be adjusted by rotating the locking member 10 by different quantities of turns, so that the conductive sheet of the busway can be clamped.

The fit between the locking member 10 and the base 11 is not limited to a threaded fit. In this application, the locking member is not limited to being operated in a rotational manner, and the locking member may be alternatively operated in a push-pull manner to move reciprocally. For example, a sliding groove extending in the first direction is disposed on the base, a positioning groove is disposed on an inner wall of the sliding groove, the locking member may be pushed/pulled in the first direction to drive the drive member to move, and a positioning structure on the locking member may fit with the positioning groove to fasten the drive member in terms of location.

In an implementation, each connection unit 130 includes a first insulation sheet 1301, a first conductive sheet 1302 fastened to the first insulation sheet 1301, a second insulation sheet 1303, and a second conductive sheet 1304 fastened to the second insulation sheet 1303. A slot 1305 is formed between the first conductive sheet 1302 and the second conductive sheet 1304, and is configured to be plug-connected to the copper busbar of the busway. A spacing between the first conductive sheet 1302 and the second conductive sheet 1304 may be changed, to implement insertion or detachment of the conductive sheet of the busway.

In this application, the locking member 10 is operated to drive the drive member 12 to move, and the fitting part 122 of the drive member 12 fits with the connection block 131. In this implementation, movement of the drive member 12 in the first direction can generate a component force in the second direction in a fitting manner of being in contact with an oblique surface. The component force in the second direction is a component force perpendicular to the first conductive sheet 1302 and the second conductive sheet 1304, and the component force in the second direction causes relative displacement between the first insulation sheet 1301 and the second insulation sheet 1303 in each connection unit 130, so that the first conductive sheet 1302 and the second conductive sheet 1304 approach each other, to clamp the conductive sheets (that is, the copper busbar 210 and the copper busbar 220) of the busway 21 and the busway 22, thereby implementing interconnection between the busway 21 and the busway 22.

In an implementation in which there are two or more connection units 130, a second insulation sheet 1303 of one of the connection units 130 and a first insulation sheet 1301 of a neighboring connection unit 130 may be an integrally molded structure. For example, an intermediate insulation sheet is formed in a one-time injection molding manner. It may be understood that the first insulation sheet 1301 and the second insulation sheet 1303 may be made of a same material, for example, both made of a plastic material. An intermediate insulation sheet structure may be made in a mold through one-time injection molding, and a second conductive sheet and a first conductive sheet of different connection units are respectively installed on two opposite surfaces of the intermediate insulation sheet. Forming the intermediate insulation sheet in the integral molding manner helps achieve a faster assembly process. Essentially, the intermediate insulation sheet may be considered as a set of the first insulation sheet and the second insulation sheet. In another implementation, a plurality of first insulation sheets and a plurality of second insulation sheets may be separately manufactured in batches, and the first insulation sheet and the second insulation sheet may be fastened together back to back, so that the foregoing intermediate insulation sheet is formed. A process of manufacturing the plurality of first insulation sheets and the plurality of second insulation sheets in batches and then reassembling the plurality of first insulation sheets and the plurality of second insulation sheets brings convenience to a manufacturing process of the first insulation sheet and the second insulation sheet, thereby saving a mold.

Figure 6:
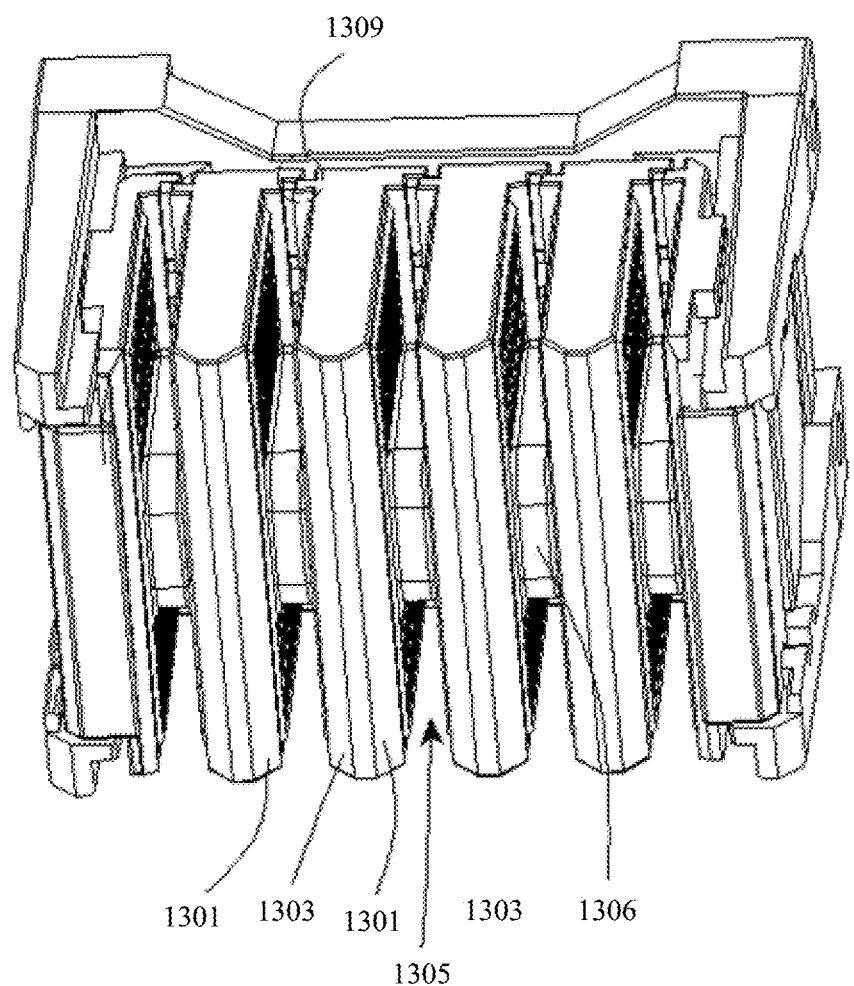
FIG. 6 is a schematic three-dimensional assembly view of a busway connector in another direction according to an implementation of this application.

Referring to FIG. 5 and FIG. 6, the first insulation sheet 1301 is elastically connected to the second insulation sheet 1303 by using an elastic member 1306 (the connection may be a direct connection or an indirect connection), and the spacing between the first conductive sheet 1302 and the second conductive sheet 1304 is changed through elastic deformation of the elastic member 1306.

The connection block 131 is connected to a first insulation sheet 1301 of a connection unit 130 at a row head through fastening and/or connected to a second insulation sheet 1303 of a connection unit 130 at a row tail through fastening, in other words, there may be one connection block 131, and when there is one connection block 131, the connection block 131 may be located on a side that is of the first insulation sheet 1301 of the connection unit 130 at the row head and that is opposite to the first conductive sheet 1302, or the connection block 131 may be located on a side that is of the second insulation sheet 1303 of the connection unit 130 at the row tail and that is opposite to the second conductive sheet 1304. Alternately, there may be two connection blocks 131, that is, one connection block 131 is disposed at each of the row head and the row tail, and the two connection blocks 131 are respectively fastened to the first insulation sheet 1301 at the row head and the second insulation sheet 1303 at the row tail. The connection block 131 is slidably connected to the base 11 and can move in the second direction A2 relative to the base 11. An angle is formed between the second direction A2 and the first direction A1, to change a movement direction. Specifically, the angle between the second direction A2 and the first direction A1 may be approximately 90 degrees, in other words, the second direction A2 and the first direction A1 may be in an approximately perpendicular state. In this application, the two directions are not limited to being completely perpendicular to each other, and it is specified that the two directions are perpendicular to each other means that extension trends of the two directions are perpendicular to each other. For example, a movement force of the first direction A1 is vertical, a movement force of the second direction A2 is horizontal, the movement force of the first direction A1 may deviate from a vertical direction by a specific angle, and provided that a relatively large quantity of component forces are formed in the vertical direction, it can be considered that the first direction A1 has an extension trend in the vertical direction.

In an implementation, a hardness of the connection block 131 is greater than a hardness of the first insulation sheet 1301 and the second insulation sheet 1303. In this implementation, a material of the connection block 131 may be metal, and materials of the first insulation sheet 1301 and the second insulation sheet 1303 may be plastic. The connection block 131 and the first insulation sheet 1301 (or the second insulation sheet 1303) may be integrally molded by using two materials. For "integrally molded by using two materials", it may be understood that in an implementation, the material of the connection block 131 is metal, the materials of the first insulation sheet 1301 and the second insulation sheet 1303 are plastic, the first insulation sheet 1301 and the second insulation sheet 1303 may be made by injection molding, and in an injection molding process, the metal material is directly placed in a mold and then injection molding is performed, to form the connection block 131 and the first insulation sheet 1301 (or the second insulation sheet 1303) that are an integrally molded structure. Alternatively, the connection block 131 and the first insulation sheet 1301 (or the second insulation sheet 1303) may be a two-piece structure and connected through fastening by using, for example, a buckle or a screw.

Figure 8:
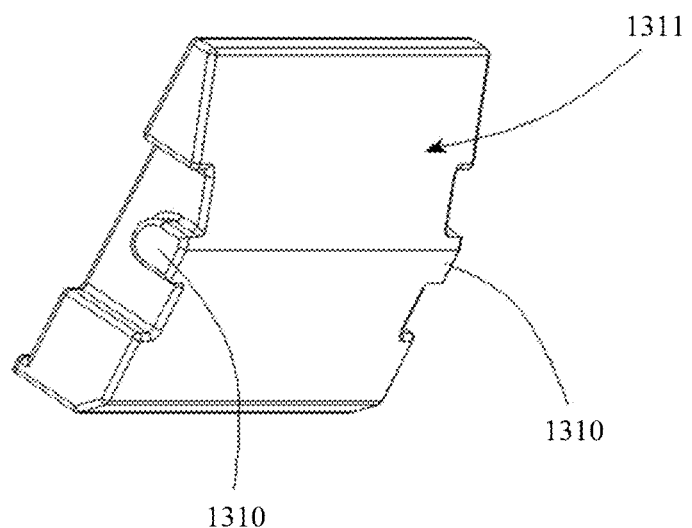
FIG. 8 is a schematic diagram of a structure of a connection block of a busway connector according to an implementation of this application.
Figure 19:
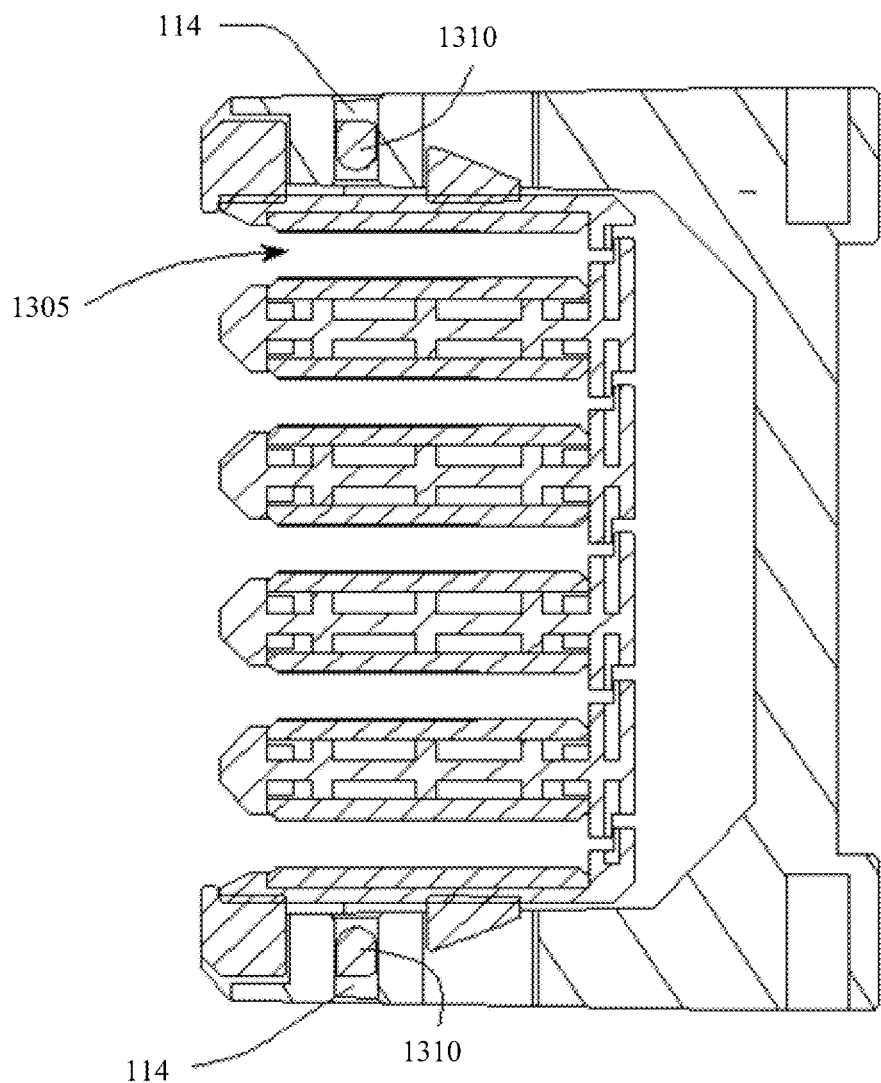
FIG. 19 is a schematic cross-sectional view of a busway connector according to an implementation of this application.

As shown in FIG. 8, the connection block 131 includes one pair of limiting columns 1310 and an oblique surface 1311. In an implementation, the connection block 131 is located in an assembly space between one pair of columns 113, and the limiting column 1310 on the connection block 131 fits with the limiting groove 114 in FIG. 4 (FIG. 19 shows a cross section of a structure in which the limiting column 1310 fits with the limiting groove 114), to prevent the installation block from moving in the first direction A1, and allow the connection block 131 to move only in the second direction A2 to move the connection unit 130. The oblique surface 1311 is configured to fit with the fitting part 122 of the drive member 12 to generate a component force in the second direction A2.

Referring to FIG. 5, the connection block 131 is partially located between the fitting part 122 and the connection unit 130, and the fitting part 122 fits with the connection block 131 by using the oblique surface, so that movement of the drive member 12 in the first direction A1 is converted into movement of the connection block 131 in the second direction A2, to clamp the connection unit 130. In this implementation, in a process of operating the locking member 10, the fitting part 122 of the drive member 12 generates a force applied on the connection block 131 and generates a component force in the second direction A2 through fitting with the oblique surface, and the component force in the second direction A2 is perpendicular to the first conductive sheet 1302 and the second conductive sheet 1304, to drive the connection unit 130 to move along a connection tube 132.

In an implementation, the component force in the second direction A2 is perpendicular to the first conductive sheet 1302 and the second conductive sheet 1304, and is used to drive the first conductive sheet 1302 and the second conductive sheet 1304 to approach each other to clamp the copper busbars of the busways, thereby implementing interconnection between the busways. The component force in the second direction A2 is perpendicular to the first conductive sheet 1302 and the second conductive sheet 1304, and due to a direct action of this force, no component force in another direction is generated, so that the first conductive sheet 1302 and the second conductive sheet 1304 can approach each other more smoothly.

In this application, the elastic member 1306 is disposed to be elastically connected between the first insulation sheet 1301 and the second insulation sheet 1303, so that when the busway connector 1 has not been installed onto the busway, due to an elastic expansion action of the elastic member 1306, a spacing between the first conductive sheet 1302 and the second conductive sheet 1304 is relatively large and can be kept in a proper range. The proper range indicates that a proper spacing is just enough for easy insertion of one copper busbar of the busway, and does not simultaneously accommodate two copper busbars. In this way, it can be ensured that copper busbars are sequentially inserted into corresponding slots 1305, to prevent misalignment, and the copper busbar of the busway can be inserted into the slot 1305 without a relatively large insertion force, so that fast installation can be implemented.

Figure 20:
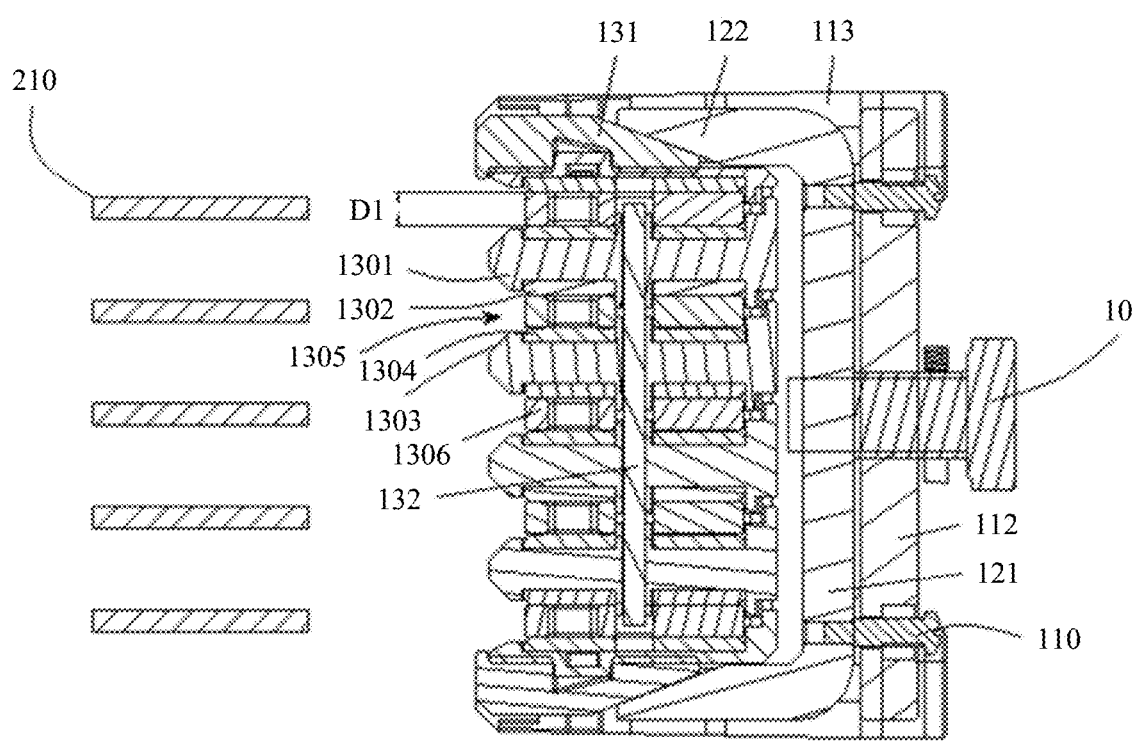
FIG. 20 is a schematic diagram before installation between a busway connector and a busway according to an implementation of this application.
Figure 21:
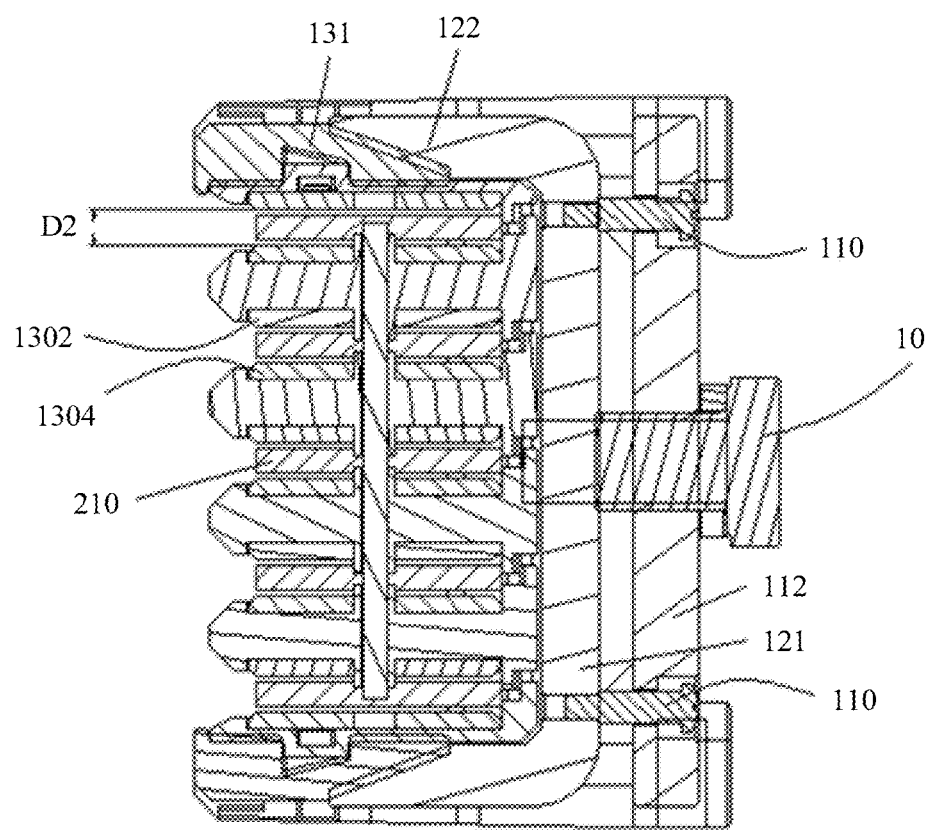
FIG. 21 is a schematic diagram after installation between a busway connector and a busway according to an implementation of this application.

Referring to FIG. 4, FIG. 20, and FIG. 21, in an implementation, the connection component 13 further includes the connection tube 132 that extends in the second direction A2, and all the connection units 130 are connected to the connection tube 132 in series and can slide on the connection tube. In this implementation, the locking member 10 is operated to generate an external force applied on the connection unit 130, so that the first insulation sheet 1301, the second insulation sheet 1303, the first conductive sheet 1302, the second conductive sheet 1304, and the elastic member of the connection unit 130 can move on the connection tube 132, to adjust the spacing between the first conductive sheet 1302 and the second conductive sheet 1304, thereby implementing plug-connection and fastening of the copper busbar of the busway.

In an implementation, the connection unit 130 includes a bottom end (a side near the drive member 12) and an opening end disposed opposite to the bottom end, and the connection tube 132 is disposed through the connection unit 130 and is located between the opening end and the bottom end. The connection tube 132 is located in a central area of the first conductive sheet 1302 and the second conductive sheet 1304, so that the connection component 13 has a stable structure.

Figure 9:
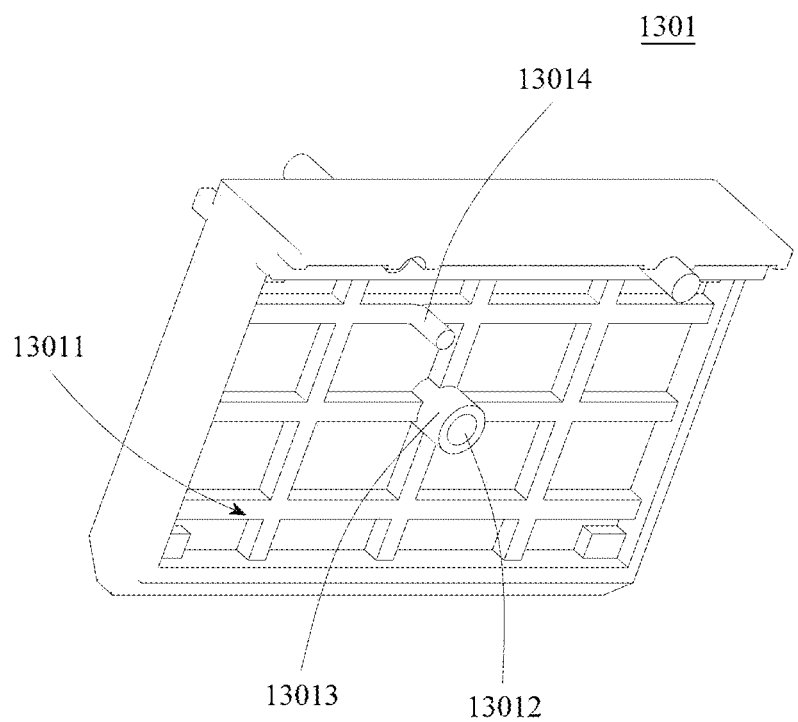
FIG. 9 is a schematic diagram of a structure of a first insulating sheet of a busway connector according to an implementation of this application.
Figure 10:
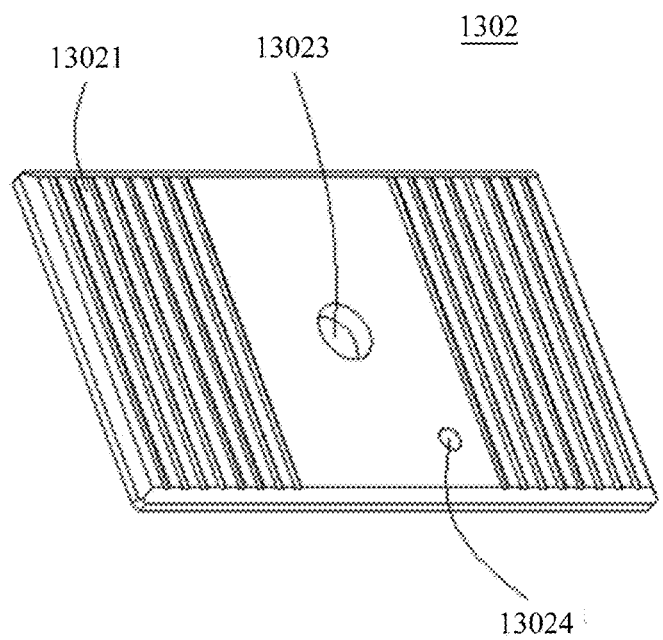
FIG. 10 is a schematic diagram of a structure of a first conductive sheet of a busway connector according to an implementation of this application.

Another implementation is shown by FIG. 4 and FIG. 9. A first accommodation groove 13011 is disposed on a surface of the first insulation sheet 1301, the first conductive sheet 1302 is installed in the first accommodation groove 13011 and is adhered to a bottom surface of the first accommodation groove 13011, and the bottom surface of the first accommodation groove 13011 is equivalent to a first installation surface for installing the first conductive sheet 1302 on the first insulation sheet 1301. As shown in FIG. 9, in an implementation, a first through hole 13012, a first sleeve 13013, and a first positioning column 13014 are disposed on the first insulation sheet 1301, and the first through hole 13012 is configured to have the connection tube 132 disposed therethrough, to assemble all the connection units 130 as a whole. The first sleeve 13013 rises above the first installation surface (that is, the bottom surface of the first accommodation groove 13011), and the first sleeve 13013 is located on the periphery of the first through hole 13012. With reference to FIG. 10, a connection through hole 13023 and a first positioning hole 13024 are disposed on the first conductive sheet 1302, the first sleeve 13013 fits with the connection through hole 13023, and the first positioning column 13014 is disposed through the first positioning hole 13024, to jointly determine an installation location of the first conductive sheet 1302 on the first insulation sheet 1301. After the assembly, an outer side of the first sleeve 13013 is the first conductive sheet 1302, and an inner side of the first sleeve 13013 is the connection tube 132. The first conductive sheet 1302 and the first insulation sheet 1301 are connected to each other through fastening and can only be positioned in one orientation. If the first conductive sheet 1302 is rotated or turned over, installation between the first conductive sheet and the first insulation sheet cannot be completed. In this way, installation errors can be prevented, to ensure an assembly pass rate of the busway connector and improve installation efficiency.

Figure 11:
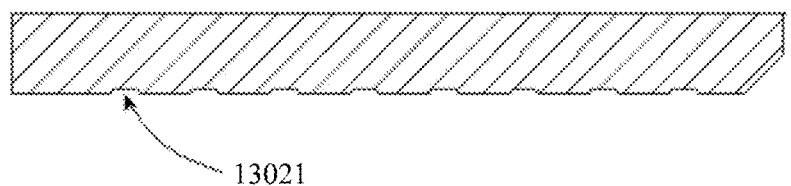
FIG. 11 is a cross-sectional view of the first conductive sheet shown in FIG. 10.

As shown in FIG. 10 and FIG. 11, in an implementation, a trench 13021 is disposed on a surface of the first conductive sheet 1302 and that faces the second conductive sheet. In the connection unit 130, the trench 13021 is connected to the slot, and has a heat dissipation capability. Specifically, there are a plurality of trenches, arranged on the surface of the first conductive sheet 1302 to form a vertical knurled pattern. When the busway connector is connected to the busway, the vertical knurled pattern improves friction of the surface of the first conductive sheet 1302, so that a clamping force can be improved, and ventilation can be performed by using the trench 13021, to implement heat dissipation. A structure of the second conductive sheet 1304 is the same as that of the first conductive sheet 1302, and details are not described again.

In this application, the elastic member 1306 disposed in the busway connector meets the elastic connection between the first insulation sheet 1301 and the second insulation sheet 1303, so that in an uninstalled state, a proper gap is formed between the first conductive sheet 1302 and the second conductive sheet 1304, to facilitate insertion of the copper busbar of the busway; in an installed state, the elastic member 1306 is compressed and stores elastic potential energy; and during detachment, a distance between the first conductive sheet 1302 and the second conductive sheet 1304 is enlarged under the action of the elastic potential energy.

The elastic member 1306 may be directly or indirectly connected to the first insulation sheet 1301 and the second insulation sheet 1303. Details are as follows:

In an implementation, the elastic member 1306 is indirectly connected to the first insulation sheet 1301 and the second insulation sheet 1303. The elastic member 1306 is indirectly connected to the first insulation sheet 1301 and the second insulation sheet 1303 by being directly connected to the first conductive sheet 1302 and the second conductive sheet 1304.

Figure 12:
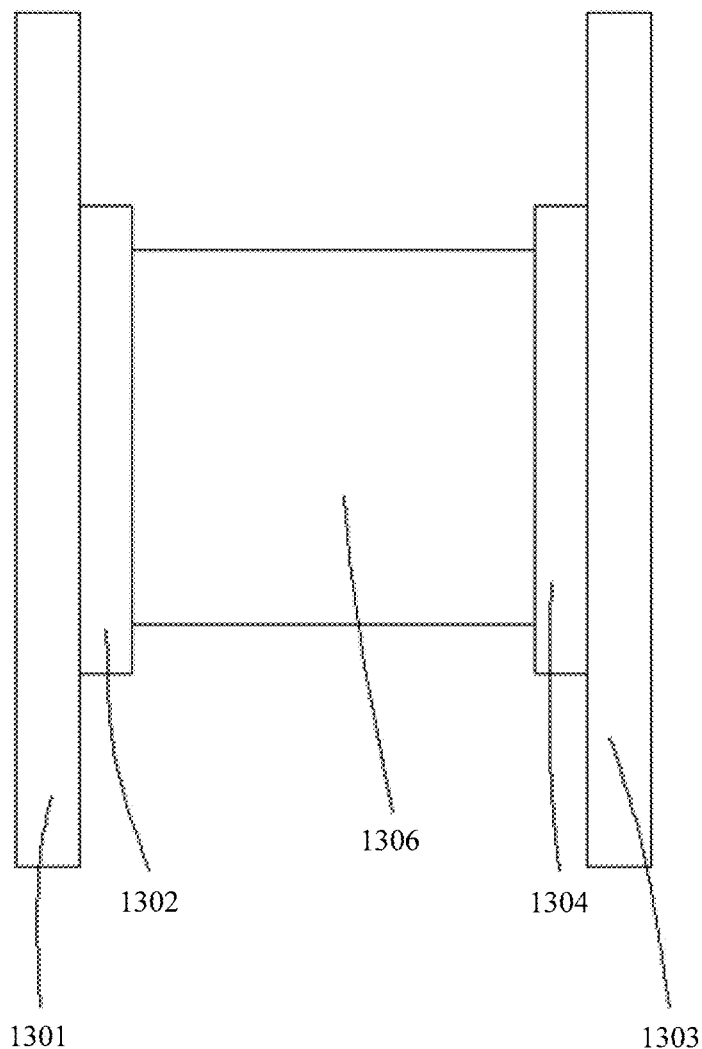
FIG. 12 is a schematic diagram of a connection structure of an elastic member of a busway connector according to an implementation of this application.
Figure 13:
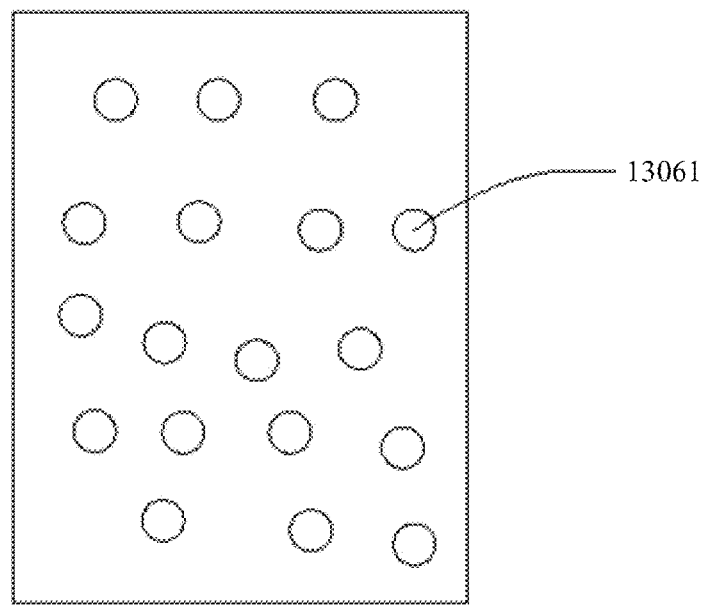
FIG. 13 is a schematic diagram of a distribution of circular hole gaps in an elastic member of a busway connector according to an implementation of this application.
Figure 14:
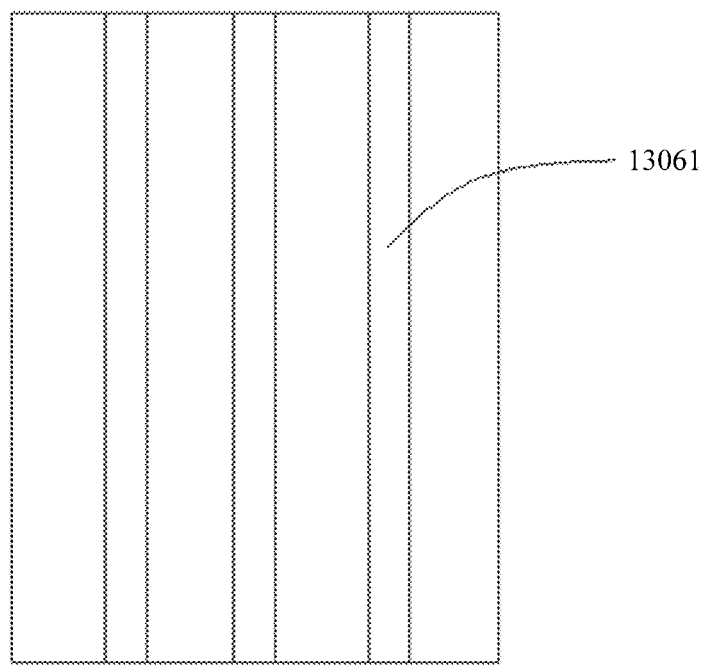
FIG. 14 is a schematic diagram of a distribution of strip-shaped gaps in an elastic member of a busway connector according to an implementation of this application.

As shown in FIG. 12, the elastic member 1306 is disposed between the first conductive sheet 1302 and the second conductive sheet 1304 and is in insulated contact with both the first conductive sheet 1302 and the second conductive sheet 1304, provided that an insulation connection structure is formed at a contact location, to ensure that there is no short circuit between the first conductive sheet 1302 and the second conductive sheet 1304. In a possible implementation, the elastic member 1306 is an integrally molded insulation elastic pad-like structure, for example, a rubber pad. In this implementation, a material of the elastic member is not limited to rubber, and may be alternatively another non-conductive elastic material, such as silica gel or compressed foam, provided that the elastic member has an elastic expansion and contraction function. The elastic member is directly connected to the first conductive sheet and the second conductive sheet, so that the connection unit has a simple structure and is easy to assemble. To enhance an elastic expansion and contraction capability of the elastic member, in an implementation, when the elastic member is an integral insulation pad-like structure, gaps are disposed in the elastic member. The gaps may be in a shape of a honeycomb, or may be in another arrangement architecture. For example, strip-shaped gaps can be arranged in a shape of a multi-row and multi-column array, or annular gaps, circular gaps, or irregular gaps can be distributed. Disposition of the gaps makes the elastic member easier to be compressed and prone to be elastically deformed. In addition, weight can be reduced, so that the busway connector is overall lighter. As shown in FIG. 13, in an implementation, circular gaps 13061 are disposed in the elastic member 1306, and the circular gaps 13061 may be sequentially arranged or may be irregularly arranged. As shown in FIG. 14, in an implementation, strip-shaped gaps 13062 are disposed in the elastic member 1306.

In another implementation, the elastic member may alternatively include a metal piece, such as a spring. Insulation sheets are disposed at two ends of the metal piece. The metal piece is connected to the first conductive sheet and the second conductive sheet through fastening by using the insulation sheets. Disposition of the insulation sheets may prevent a short circuit between the first conductive sheet and the second conductive sheet. In this implementation, the metal piece is used as the elastic member, so that the elastic member has both relatively good elasticity and a relatively strong service life. The metal piece can implement relatively good elasticity by using a relatively small volume. This is more helpful for lightweight development of the busway connector.

Figure 15:
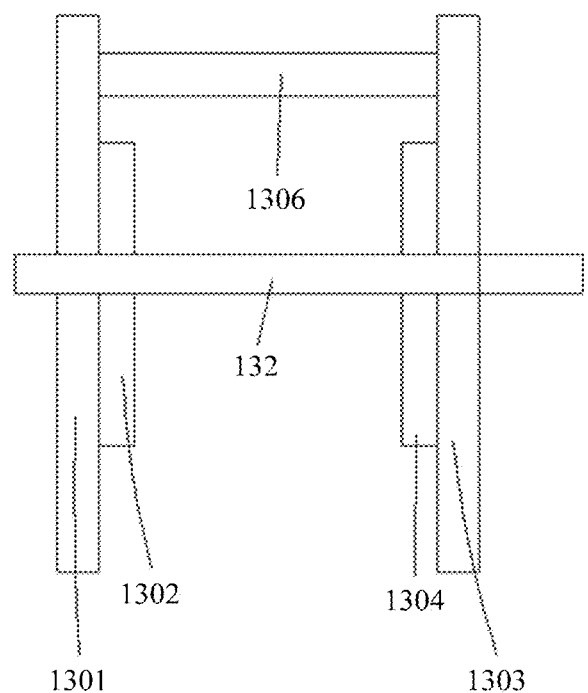
FIG. 15 is a schematic diagram of a connection structure of an elastic member of a busway connector according to another implementation of this application.
Figure 16:
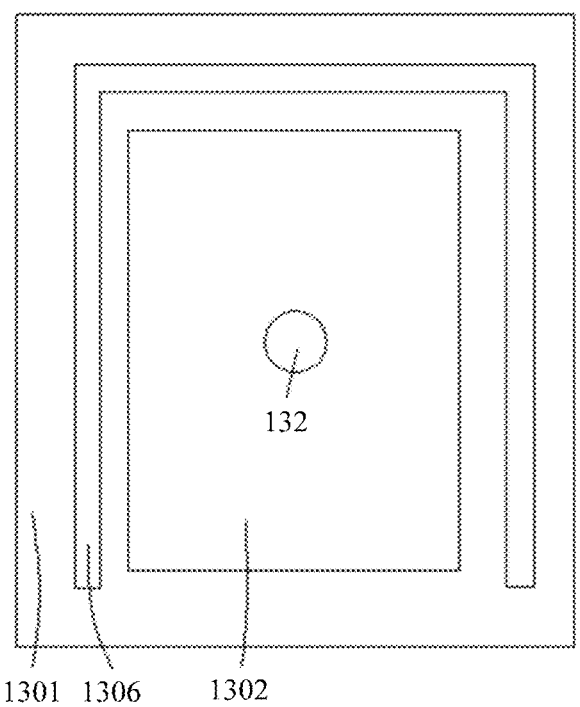
FIG. 16 is a view of the structure of the elastic member shown in FIG. 15 in another direction.
Figure 17:
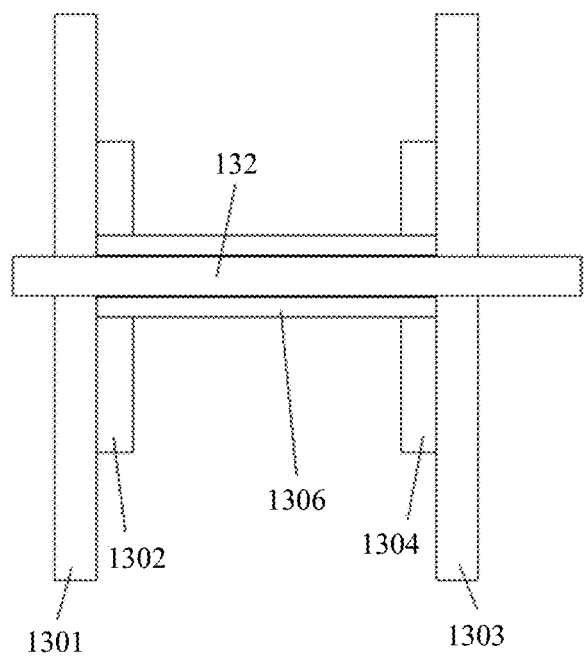
FIG. 17 is a schematic diagram of a connection structure of an elastic member of a busway connector according to still another implementation of this application.
Figure 18:
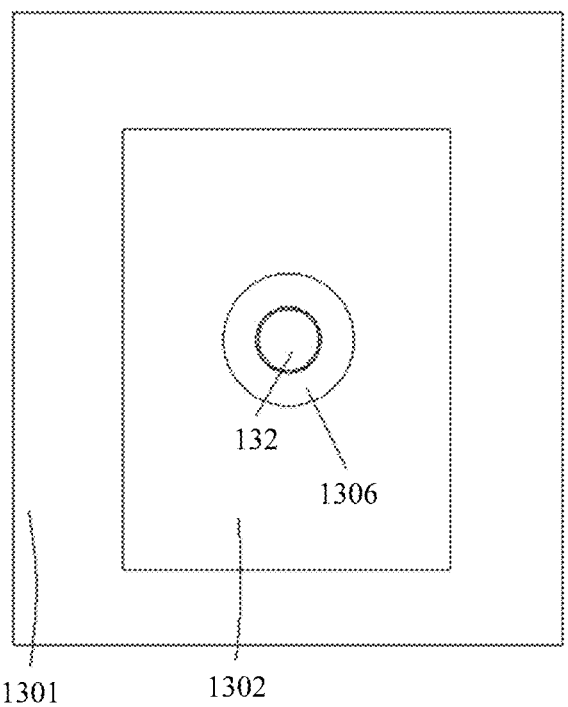
FIG. 18 is a view of the structure of the elastic member shown in FIG. 17 in another direction.

As shown in FIG. 15 to FIG. 18, in an implementation, the elastic member 1306 is directly connected to the first insulation sheet 1301 and the second insulation sheet 1303. The elastic member is an insulation member, and may be made of an insulation material, or an insulation layer may be disposed on a surface of the elastic member to implement an insulation function of the elastic member. In this implementation in which the elastic member is directly connected to the first insulation sheet and the second insulation sheet, the elastic member may be disposed on the periphery of the first conductive sheet and the second conductive sheet. As shown in FIG. 15 and FIG. 16, the elastic member 1306 does not completely surround the first conductive sheet 1302, to leave one end as an opening of the slot. Actually, the elastic member 1306 may be disposed on any side that is of the first conductive sheet 1302 and the second conductive sheet 1304 and that avoids an entrance of the slot, such that the elastic member 1306 does not block the entrance of the slot. The elastic member 1306 may jointly surround the first conductive sheet 1302 and the second conductive sheet 1304 with the first insulation sheet 1301 and the second insulation sheet 1303, and a location of the entrance of the slot is left. The elastic member 1306 is supported between the first insulation sheet 1301 and the second insulation sheet 1303, so that a gap, namely, the slot, is formed between the first conductive sheet 1302 and the second conductive sheet 1304. In another implementation, referring to FIG. 17 and FIG. 18, through holes may be disposed on the first conductive sheet 1302 and the second conductive sheet 1304. The elastic member 1306 is connected to the first insulation sheet 1301 by being disposed through a through hole of the first conductive sheet 1302, the elastic member 1306 is connected to the second insulation sheet 1303 by being disposed through a through hole of the second conductive sheet 1304, and the elastic member 1306 is insulated from both the first conductive sheet 1302 and the second conductive sheet 1304. In an embodiment shown in FIG. 17 and FIG. 18, an annular through hole is disposed on the first conductive sheet 1302, and the annular through hole is located on the periphery of the connection tube 132. Correspondingly, the elastic member 1306 is in a shape of a hollow cylinder, the connection tube 132 is disposed through a hollow channel of the elastic member 1306, the elastic member 1306 forms a sleeve on the connection tube, and the two ends of the elastic member 1306 are respectively disposed through the first conductive sheet 1302 and the second conductive sheet 1304 and connected to the first insulation sheet 1301 and the second insulation sheet 1303 through fastening. In this case, the elastic member 1306 may be disposed in a central area of the first conductive sheet 1302 and the second conductive sheet 1304. In this way, it is helpful to ensure that the connection unit has a stable structural layout, and the elastic member 1306 is elastically expanded and contracted more smoothly in processes of installing and detaching the busway connector.

As shown in FIG. 5, in an implementation, at a location of the opening end, a horn-shaped opening 1308 (an area in a circular dashed-line box) that extends outward from the slot 1305 is formed between the first insulation sheet 1301 and the second insulation sheet 1303, and is used for guiding in a process of being plug-connected to the busway, to help insert the conductive sheet of the busway into the slot 1305.

Figure 7:
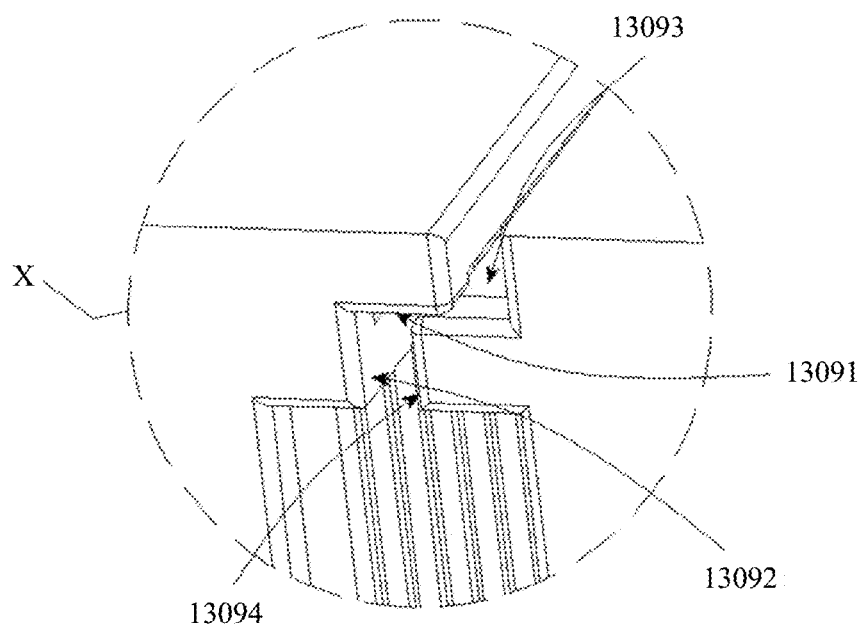
FIG. 7 is an enlarged view of a section X in FIG. 5.

In an implementation, as shown in FIG. 5 and FIG. 7, a lap structure 1309 is formed between the first insulation sheet 1301 and the second insulation sheet 1303, so that the connection unit 130 becomes an assembled integral architecture by using the lap structure 1309. The lap structure 1309 includes a first lap wall 13091 and a first limiting wall 13092 on the first insulation sheet 1301, and a second lap wall 13093 and a second limiting wall 13094 that are integrally molded on the second insulation sheet 1303. The first lap wall 13091 and the first limiting wall 13092 form an L-shaped structure. The second lap wall 13093 and the second limiting wall 13094 form an L-shaped structure. The first lap wall 13091 is in contact with the second lap wall 13093. In a process in which the first conductive sheet 1302 and the second conductive sheet 1304 approach each other, the first lap wall 13091 and the second lap wall 13093 oppositely move and respectively move to the second limiting wall 13094 and the first limiting wall 13092.

As shown in FIG. 20 and FIG. 21, when the busway connector 1 is not installed onto the busway, the locking member 10 is in an unlocked state. Due to elasticity of the elastic member 1306, the first insulation sheet 1301 and the second insulation sheet 1303 are in an open state. Due to an elastic expansion action of the elastic member 1306, a specific spacing is kept between the first conductive sheet 1302 and the second conductive sheet 1304. As shown in FIG. 20, the spacing between the first conductive sheet 1302 and the second conductive sheet 1304 is D1, and the spacing may be determined based on a thickness of the copper busbar 210 of the busway. This spacing needs to be enough for easy insertion of one copper busbar of the busway, and does not simultaneously accommodate two copper busbars. In this way, it can be ensured that copper busbars are sequentially inserted into corresponding slots 1305, to prevent misalignment, and the copper busbar of the busway can be inserted into the slot 1305 without a relatively large insertion force, so that installation is easy and installation efficiency is high. After a force in the second direction A2 is applied, the spacing between the first conductive sheet 1302 and the second conductive sheet 1304 becomes smaller. As shown in FIG. 21, the spacing between the first conductive sheet 1302 and the second conductive sheet 1304 is D2, and D2<D1. The elastic member 1306 is compressed and stores elastic potential energy, so that the copper busbar 210 of the busway can be clamped, thereby implementing interconnection between the busways. When detachment is needed, that is, when the busway connector needs to be detached from the busway, only the locking member 10 needs to be rotated, to drive the drive member 12 to move in a direction away from the connection component, cancelling a force applied on the connection block 131. In this case, under the action of the elastic potential energy of the elastic member 1306, relative displacement is generated between the first insulation sheet 1301 and the second insulation sheet 1303, so that a distance between the first conductive sheet 1302 and the second conductive sheet 1304 becomes larger. When the spacing between the first conductive sheet 1302 and the second conductive sheet 1304 is adjusted to D1, the busway connector can be easily removed. The busway connector provided in this application can be installed and detached only by operating the locking member 10, and an operator can operate the locking member 10 with a single hand, so that fast installation can be implemented.

The foregoing descriptions are example implementations of this application. It should be noted that a person of ordinary skill in the art may further make improvements or polishing without departing from the principle of this application and the improvements or polishing shall fall within the protection scope of this application.

What is claimed is:

1. A busway connector, comprising:
    a base, a drive member, a connection component, and a locking member, wherein the drive member is located between the base and the connection component, the locking member is disposed through the base and fastened to the drive member, and the locking member engages with the base to drive the drive member to move reciprocally in a first direction;
    the connection component comprises a connection block and one or more connection units connected in series in a row, the row including a row head and a row tail at opposite ends thereof, each connection unit comprising a first insulation sheet, a first conductive sheet fastened to the first insulation sheet, a second insulation sheet, and a second conductive sheet fastened to the second insulation sheet, a slot formed between the first conductive sheet and the second conductive sheet, and an elastic member elastically connecting the first insulation sheet to the second insulation sheet;
    the connection block is fastened to a first insulation sheet of a first connection unit at the row head or fastened to a second insulation sheet of a second connection unit at the row tail;
    the connection block is slidably connected to the base and can move in a second direction relative to the base; and
    the drive member engages with the connection block, to enable a force applied by the drive member to the connection block in the first direction, to generate a component force in the second direction, to drive the first conductive sheet and the second conductive sheet to approach each other and compress the elastic member.

2. The busway connector according to claim 1, further comprising two connection blocks, respectively fastened to the first insulation sheet at the row head and the second insulation sheet at the row tail, and a hardness of the connection block slidably connected to the base is greater than a hardness of the first insulation sheet and of the second insulation sheet.

3. The busway connector according to claim 2, wherein the drive member comprises a crossbeam and two fitting parts located on two opposite sides of the crossbeam, the connection block slidably connected to the base is partially located between one of the two fitting parts and the one or more connection units, and the one of the fitting parts engages with an oblique surface of the connection block slidably connected to the base, to enable movement of the drive member in the first direction to be converted into movement of the connection block slidably connected to the base in the second direction, to clamp the one or more connection units.

4. The busway connector according to claim 3, wherein the crossbeam is movably connected to the base by limiting screws.

5. The busway connector according to claim 2, wherein each connection block comprises one pair of limiting columns, the base comprises a baseplate and two pairs of columns that are integrally interconnected, the two connection blocks are disposed between the two pairs of columns in a one-to-one correspondence, a limiting groove extending in the second direction is disposed on each column in the two pairs of columns of the base, and each limiting column of the two connection blocks separately fits with each respective limiting groove, to prevent the connection block slidably connected to the base from moving in the first direction, and to allow the connection block slidably connected to the base to move in the second direction.

6. The busway connector according to claim 1, wherein the elastic member is disposed between the first conductive sheet and the second conductive sheet and is in insulated contact with both the first conductive sheet and the second conductive sheet.

7. The busway connector according to claim 6, wherein the elastic member is an integrally molded insulation elastic pad.

8. The busway connector according to claim 1, wherein the component force in the second direction is perpendicular to the first conductive sheet and the second conductive sheet.

9. The busway connector according to claim 8, wherein the first direction is perpendicular to the second direction.

10. The busway connector according to claim 1, wherein the connection component further comprises a connection tube extending in the second direction, and all of the one or more connection units are connected to the connection tube in series and can slide on the connection tube.

11. The busway connector according to claim 10, wherein the one or more connection units comprises two neighboring connection units, wherein a second insulation sheet of one of the two neighboring connection units, and a first insulation sheet of the other of the two neighboring connection units, are an integrally molded structure.

12. The busway connector according to claim 10, wherein the one or more connection units comprise an opening end and a bottom end that are oppositely disposed, and the connection tube is disposed through the connection unit and is located between the opening end and the bottom end.

13. The busway connector according to claim 12, wherein at a location of the bottom end, the first insulation sheet and the second insulation sheet are joined by a lap structure.

14. The busway connector according to claim 13, wherein the lap structure comprises a first lap wall and a first limiting wall that are integrally molded on the first insulation sheet, and a second lap wall and a second limiting wall that are integrally molded on the second insulation sheet, the first lap wall and the first limiting wall form an L-shaped structure, the second lap wall and the second limiting wall form another L-shaped structure, the first lap wall is in contact with the second lap wall.

15. The busway connector according to claim 10, wherein the first insulation sheet comprises a first installation surface configured to install the first conductive sheet, a first through hole disposed on the first insulation sheet and configured to receive the connection tube therethrough, a first sleeve disposed on the first installation surface, and the first sleeve is located between the connection tube and the conductive sheet.

16. The busway connector according to claim 1, wherein a trench is defined in a surface of the first conductive sheet and the trench faces the second conductive sheet.

17. A power supply device, comprising:
a first busway and a second busway, each busway including conductive sheets; and
a busway connector connecting the first busway and second busway, the busway connector including:
a base, a drive member, a connection component, and a locking member, wherein the drive member is located between the base and the connection component, the locking member is disposed through the base and fastened to the drive member, and the locking member engages with the base to drive the drive member to move reciprocally in a first direction,
the connection component comprises a first connection block and one or more connection units connected in series in a row, the row including a row head and a row tail at opposite ends thereof, each connection unit comprising a first insulation sheet, a first conductive sheet fastened to the first insulation sheet, a second insulation sheet, and a second conductive sheet fastened to the second insulation sheet, a slot formed between the first conductive sheet and the second conductive sheet, and an elastic member elastically connecting the first insulation sheet to the second insulation sheet,
the connection block is fastened to a first insulation sheet of a first connection unit at the row head or fastened to a second insulation sheet of a second connection unit at the row tail,
the connection block is slidably connected to the base and can move in a second direction relative to the base, and
the drive member engages with the connection block, to enable a force applied by the drive member to the connection block in the first direction to generate a component force in the second direction, to drive the first conductive sheet and the second conductive sheet to approach each other and compress the elastic member,
wherein the conductive sheets of the first and the second busways are inserted in the slot.

18. The power supply device according to claim 17, further comprising two connection blocks, respectively fastened to the first insulation sheet at the row head and the second insulation sheet at the row tail, and a hardness of the connection block slidably connected to the base is greater than a hardness of the first insulation sheet and the second insulation sheet.

19. The power supply device according to claim 18, wherein the drive member comprises a crossbeam and two fitting parts located on two opposite sides of the crossbeam, the connection block is partially located between one of the two fitting parts and the one or more connection units, and the one fitting part engages with an oblique surface of the connection block, to enable movement of the drive member in the first direction to be converted into movement of the connection block in the second direction, to clamp the one or more connection units.

20. The power supply device according to claim 19, wherein the crossbeam is movably connected to the base by limiting screws.

* * * * *